United States Patent
Cassidy

(10) Patent No.: US 9,855,713 B2
(45) Date of Patent: Jan. 2, 2018

(54) ADVANCED REFLECTIVE TIRE MARKING SYSTEM FOR USE AS A WARNING INDICATION TO HIGHLIGHT THE WIDTH OF LARGE VEHICLES

(71) Applicant: Andrew Cassidy, Drogheda (IE)

(72) Inventor: Andrew Cassidy, Drogheda (IE)

(*) Notice: Subject to any disclaimer, the term of this patent is extended or adjusted under 35 U.S.C. 154(b) by 418 days.

(21) Appl. No.: 14/088,337

(22) Filed: Nov. 22, 2013

(65) Prior Publication Data
US 2015/0144054 A1 May 28, 2015

(51) Int. Cl.
- B60Q 1/30 (2006.01)
- B29D 30/06 (2006.01)
- B60C 13/00 (2006.01)
- B60C 11/00 (2006.01)
- B60Q 1/32 (2006.01)

(52) U.S. Cl.
CPC ...... *B29D 30/0681* (2013.01); *B60C 11/0041* (2013.01); *B60C 13/001* (2013.01); *B60Q 1/30* (2013.01); *B60Q 1/326* (2013.01)

(58) Field of Classification Search
CPC ..... B29D 30/06; B29D 30/0681; B60C 11/00; B60C 11/0306; B60C 11/24; B60C 19/00; B60Q 1/00; B60Q 1/0035; B60Q 1/2261; B60Q 1/30
USPC ................ 116/28 R; 152/151, 154.2, 209.5; 359/524
See application file for complete search history.

(56) References Cited

U.S. PATENT DOCUMENTS

| | | | | |
|---|---|---|---|---|
| 2,102,784 A * | 12/1937 | Bridges | ................... | B60C 11/24 116/201 |
| 3,946,782 A * | 3/1976 | Petrasek | ................. | B60C 11/00 152/209.11 |
| 6,286,573 B1 * | 9/2001 | Hine | ....................... | B60C 11/00 152/209.18 |
| 6,298,889 B1 * | 10/2001 | Smith | ...................... | B60C 1/00 152/151 |
| 6,709,138 B1 * | 3/2004 | Johnson | .................... | B60C 9/22 152/154.2 |
| 7,112,251 B2 * | 9/2006 | Majumdar et al. | ... | B60C 13/001 152/524 |
| 7,252,127 B2 * | 8/2007 | Goetz | ..................... | B60C 11/00 152/196 |
| 2002/0170645 A1 * | 11/2002 | Norwood | ................ | B29C 70/78 152/209.16 |
| 2003/0178115 A1 * | 9/2003 | Liu | ........................ | B60C 11/00 152/209.5 |
| 2009/0114322 A1 * | 5/2009 | O'Brien | ................ | B29D 30/66 152/154.2 |
| 2010/0193094 A1 * | 8/2010 | Rosenberger | ........ | A43B 1/0027 152/154.2 |

(Continued)

FOREIGN PATENT DOCUMENTS

| | | | | |
|---|---|---|---|---|
| BE | WO 0066372 A1 * | 11/2000 | ......... | B60C 11/0316 |
| GB | 448223 A * | 6/1936 | ............ | B60C 11/24 |

(Continued)

*Primary Examiner* — Richard A Smith
(74) *Attorney, Agent, or Firm* — Richards Patent Law, P.C.

(57) ABSTRACT

The present disclosure provides a reflective tire marking system for use as a warning indication to highlight the width of large vehicles, the system including a reflective tire marking inserted into an outer edge of a tire lug, wherein the reflective tire marking is made of a reflective rubber.

8 Claims, 3 Drawing Sheets

(56) References Cited

U.S. PATENT DOCUMENTS

| | | | | |
|---|---|---|---|---|
| 2011/0126949 A1* | 6/2011 | Cuny et al. | ......... | B29D 30/0606 |
| | | | | 152/154.2 |
| 2012/0180919 A1* | 7/2012 | Larregain et al. | ...... | B60C 11/00 |
| | | | | 152/209.18 |
| 2014/0360256 A1* | 12/2014 | Orlewski | .............. | B60C 11/243 |
| | | | | 73/146 |

FOREIGN PATENT DOCUMENTS

| | | | | | |
|---|---|---|---|---|---|
| JP | 55084646 A | * | 6/1980 | ............. | B60C 19/10 |
| JP | 08318715 A | * | 12/1996 | ............. | B60C 11/00 |
| JP | 2007022172 A | * | 2/2007 | ............. | B60C 11/24 |
| JP | 2011105127 A | * | 6/2011 | ............... | B60C 11/11 |

\* cited by examiner

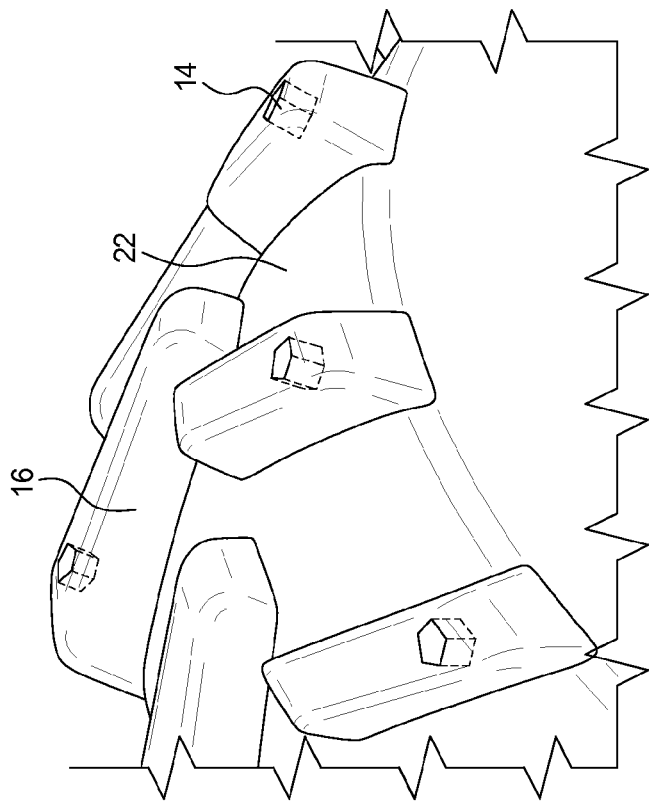
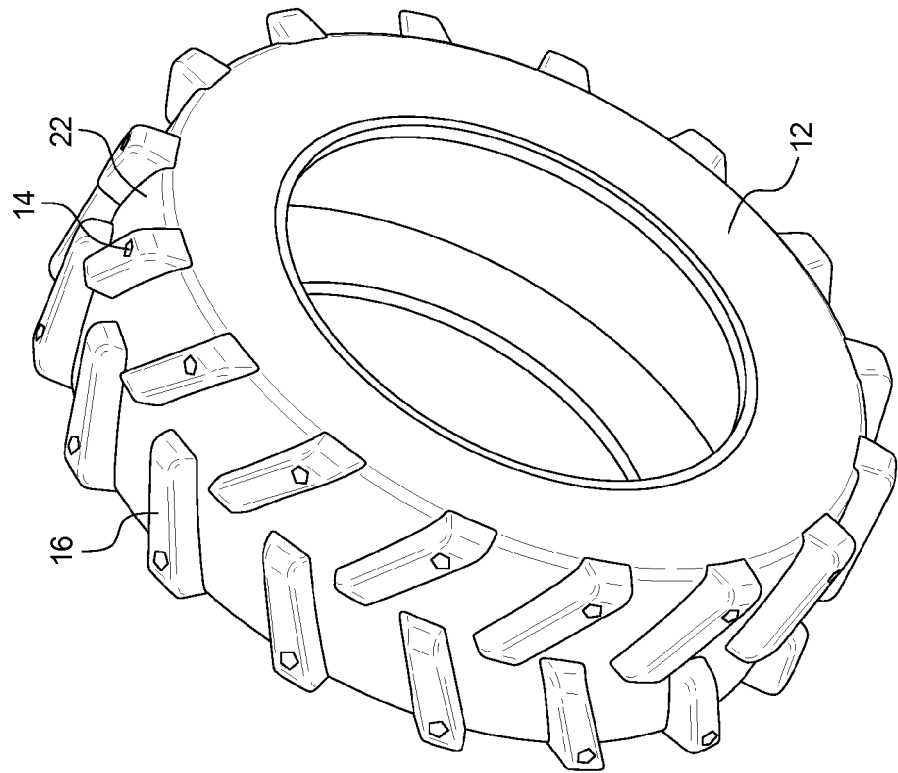

ADVANCED REFLECTIVE TIRE MARKING SYSTEM FOR USE AS A WARNING INDICATION TO HIGHLIGHT THE WIDTH OF LARGE VEHICLES

BACKGROUND OF THE INVENTION

The present subject matter relates generally to agricultural machinery tires. In particular, the subject matter relates to a new type of warning indication system.

A tire is a temporary ring shaped covering that fits around the rim of a wheel of a vehicle. Tires are composed mainly of synthetic rubber, natural rubber, fabric, high tensile steel wire along with other compound chemicals. A tire consists of a tread and a body, where the tread provides traction and the body provides support. Nowadays, tires are pneumatic inflatable structures including a doughnut shaped body of cords and wires encased in rubber to form an inflatable cushion. The main purpose of a tire is to provide traction between the vehicle and the road surface, reduce road shock for the vehicle and its occupants, and to protect the wheel rim. Tires are used on numerous types of vehicles including bicycles, motorbikes, cares, lorries, farm vehicles, earthmovers, plant machinery, and aircraft.

In agriculture, tires are used on farm vehicles usually tractors, trailers, specialist harvesters, and other types of machinery. Due to the size of these vehicles and the different types of terrain, these tires are much larger and wider than conventional car tires. These tires have very deep widely spaced lugs to allow the tire to grip soil easily. Where ground conditions are very poor and where soil compaction is a concern, wide, high floatation tires are used that have large footprints and low inflation pressures.

Agriculture vehicles often travel on public roads, particularly tractors with a trailer or another implement behind it. These vehicles are awkward and bulky on roads, especially on narrow roads in the countryside, which they use more often than larger roads, due to their proximity to agricultural farms. When other vehicles meet agricultural vehicles on these roads it is difficult to pass by.

This problem is more pronounced and significant at night when visibility on unlit public roads in the countryside is poor. When meeting large agricultural vehicles at night on these roads it is difficult to ascertain their width until in very close proximity which poses a traffic hazard. The reason for this is because the existing lighting arrangement on agricultural vehicles does not properly highlight their actual size and width. Agricultural vehicles with especially large tires and older agricultural vehicles with very poor lighting arrangements are even more dangerous.

Consequently, there exists a need for a tire design for agricultural vehicles that highlights actual size and width of these vehicles, which will allow them to travel more safely on public roads at nighttime.

BRIEF SUMMARY OF THE INVENTION

The present disclosure provides a reflective tire marking. Various examples of the marking systems are provided herein.

Specifically, the present disclosure provides a reflective tire marking comprising an luminous color, reflective, rubber mold insert and a hole in the outer section of each lug of a tire of an agricultural vehicle into which the said luminous color, reflective rubber mold insert will be securely fit.

In an embodiment, the reflective tire marking system, for use as a warning indication to highlight the width of large vehicles, includes a reflective tire marking located within a tire lug of a tire, wherein the reflective tire marking is made of a reflective rubber.

In an example, the reflective tire marking is securely fit by pressure into the at least one lug of the agricultural tire. In another example, the reflective tire marking may be located within a majority of the tire lugs on a tire. Further, the reflective tire marking may be inserted into a hole within the at least one tire lug. In an example, the reflective tire marking may be cylindrical.

The tire lug may extend toward an outer edge of tire, and wherein the reflective tire marking is located within a portion of the tire lug that approaches the outer edge of the tire. Alternatively, or in addition to, the tire lug may include an outer edge portion, wherein the outer edge portion approaches an outer edge of a tire, wherein the reflective tire marking is located within the outer edge portion of the tire lug.

In one embodiment, the reflective tire marking is a rubber mold insert in a reflective luminous color that is securely pressure fit within the outer section of each lug of the agricultural tire.

In an example, a cylindrical hole of approximately 40 millimeters (mm) in depth and radius of approximately 15 mm is bored in each lug grip of an agricultural vehicles tire, into which the reflective tire marking is pressure fit to form a permanent reflective warning indicator.

The present disclosure also provides a method of forming a tire comprising pressurize molding rubber around at least a portion one reflective tire marking, wherein the reflective tire marking is made of a reflective rubber, and wherein the reflective tire marking is positioned in a portion of a tire lug that approaches an outer edge of the tire.

An advantage of this invention is that the reflective tire marking allows for light to be reflected from the agricultural tires, highlighting the actual size, particularly the width, of large agricultural vehicles to oncoming traffic from both directions. This innovative reflective marking acts as a very effective safety design feature for all agricultural vehicles, creating a safer transport network for road users.

Additional objects, advantages and novel features of the examples are set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7A is a perspective view of an embodiment of the system in combination with a vehicle tire wherein the reflective tire markings are cylindrical pentagons.

FIG. 7B is a perspective view of an embodiment of the system in combination with a vehicle tire wherein the structure of the vehicle tire is transparent in the drawing in order to view the reflective tire markings.

DETAILED DESCRIPTION OF THE INVENTION

Figure 3:
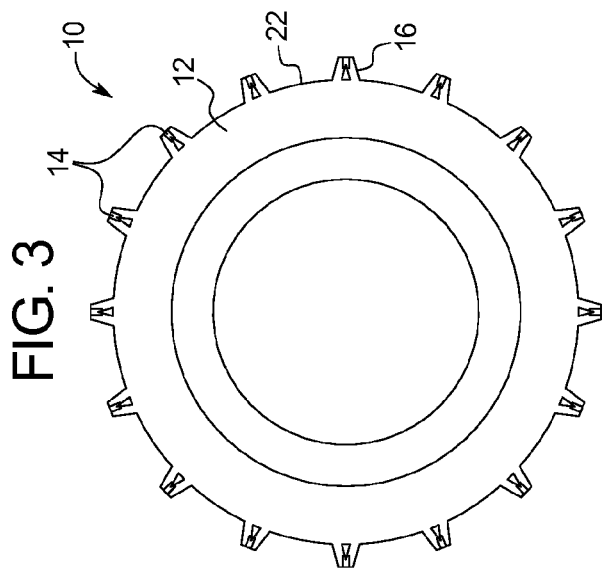
FIG. 3 is a side view of an embodiment of the reflective tire markings in connection with vehicle tires.
Figure 2:
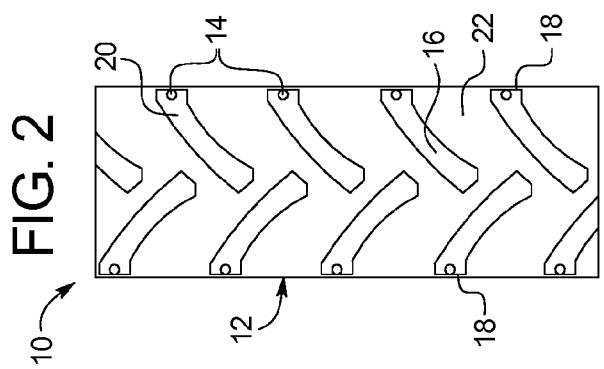
FIG. 2 is a front view of an embodiment of the reflective tire markings in connection with vehicle tires.
Figure 1:
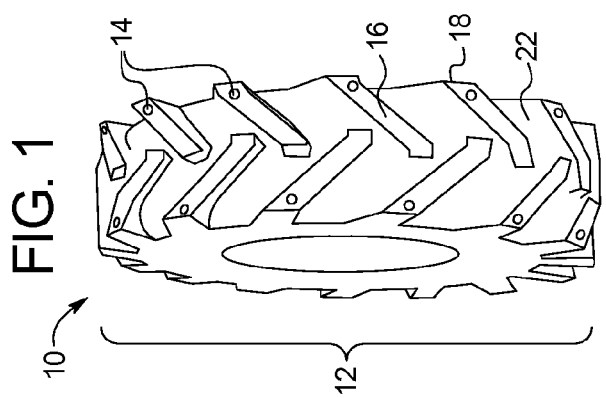
FIG. 1 is a perspective view of an embodiment of the reflective tire markings in connection with vehicle tires.

FIGS. 1-7B illustrate various embodiments of an advanced reflective tire marking system 10. As shown in FIGS. 1-3, the system 10 includes a tire 12 with reflective tire markings 14 positioned on at least one lug 16 of the vehicle tire 12. As shown in the figures, the reflective tire markings 14 may be located at various locations on the tire lugs 16. Preferably, the reflective tire markings 14 are located along the outer edge 18 of the vehicle tires 12, such that oncoming traffic is able to view the width of the vehicle based on the placement of the reflective tire markings 14.

For example, the tire lug 16 may extend toward an outer edge 18 of a tire, as shown in FIGS. 1-2, and the reflective tire marking 14 may be positioned in a portion of the tire lug 16 that approaches the outer edge 18 of the tire. In other words, the tire lug 16 may include an outer edge portion 20, as shown in FIG. 2, wherein the outer edge portion 20 approaches the outer edge 18 of a tire. In such case, the reflective tire marking 14 is located in the outer edge portion 20 of the tire lug 16.

Alternatively, the reflective tire marking 14 may be attached, inserted, or otherwise located anywhere along the face of the tire such that oncoming traffic is able to determine the width of the vehicle. For example, the reflective tire marking 14 may be inserted into the lug voids 22, wherein the lug voids 22 are the valleys in between the tire lugs 16. The reflective tire marking 14 may be located in a portion of the lug void 22 that approaches the outer edge 18 of the tire.

Figure 4:
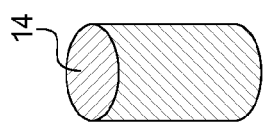
FIG. 4 is a perspective view of an embodiment of the reflective tire markings.

The reflective tire marking 14 is typically an luminous color, reflective, rubber mold insert, as shown in FIG. 4. The reflective tire marking 14 may be any shape such that the reflective tire marking 14 may fit within or otherwise attach securely to a tire lug 16. As shown in FIG. 4, the reflective tire marking 14 is a right circular cylinder. In alternate embodiments, the reflective tire marking 14 may be cuboid, conical, spherical, ovular, among others. The cross-sectional shape of the reflective tire marking 14 may be a circle, oval, triangle, square, pentagon, hexagon, heptagon, among others. The size of the reflective tire marking 14 may be any suitable size that may be secured to or within a tire lug 16. For example, the radius of the reflective tire marking 14 may be between, and including, 10 mm and 50 mm, for example 15 mm and 30 mm. The depth of the reflective tire marking 14 may be any depth that allows the reflective tire marking 14 to remain secure in the tire lug 16. The depth of the reflective tire marking 14 may be between, and including, 10 mm and 50 mm, for example, 20 mm and 40 mm, or 25 mm and 35 mm. In some instances, a greater depth may improve the stability of the reflective tire marking 14. Alternatively, the depth of the reflective tire marking 14 may be shallow, such that the reflective tire marking 14 essentially adheres to the face of the tire lug 16.

The reflective tire marking 14 may be made of any reflective material such that the reflective tire marking 14 reflects oncoming light. For example, the reflective tire marking 14 may be made of reflective plastic, rubber, metal, or combinations thereof, among others. Preferably, the reflective tire marking 14 is made of a reflective rubber material. Even more preferably, the reflective tire marking 14 has wear characteristics that are similar to the remainder of the tire such that the reflective tire markings 14 do not wear unevenly with the tire lugs 16.

Figure 5:
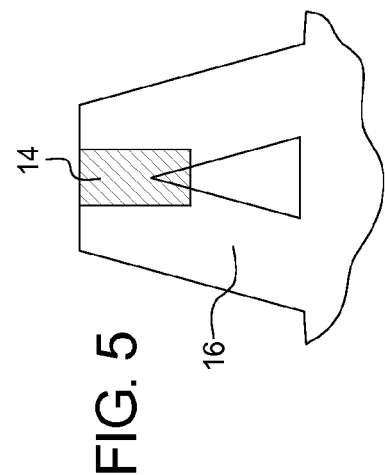
FIG. 5 is a side view of an embodiment of the reflective tire markings in connection with vehicle tires.

The reflective tire marking 14 may be fit into the tire lug 16 by various mechanisms. For example, the reflective tire marking 14 may be secured within the tire lug 16 by a pressure fit, adhesives, screws, nails, or any other fastening means. In one example, a hole may be bored in the outer edge portion 20 of each tire lug 16 of the tire 12 into which the reflective tire marking 14 is inserted. Preferably, as shown in FIGS. 3 and 5, the reflective tire marking 14 is pressure fit into the tire lugs 16.

For example, a cylindrical hole of approximately 40 mm in depth and radius of approximately 15 mm may be bored in each tire lug 16 of an agricultural vehicles tire, into which the reflective tire marking is inserted by utilizing hydraulic pressure to form a permanent reflective warning indicator. Alternatively, the tire 12 may be manufactured such that the reflective tire marking 14 may be inserted into the tire 12 during the pressurized molding stage of the tire manufacturing process.

Figure 6:
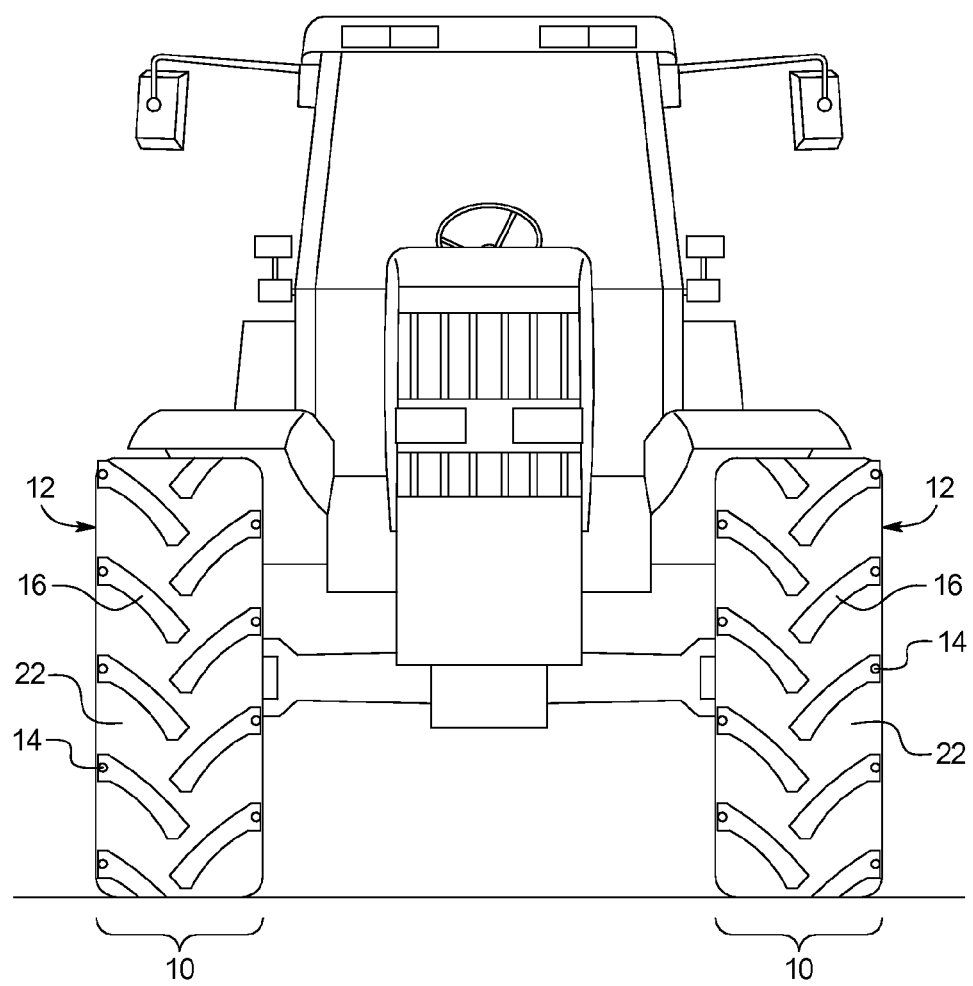
FIG. 6 is a front view of an embodiment of the system as used in combination with an agricultural vehicle.

FIG. 6 illustrates the reflective tire marking system 10 in combination with an agricultural vehicle. As shown, the tire marking system 10 is advantageous in that the reflective tire marking 14 allow light to be reflected from the agricultural tires 12, therefore, highlighting the actual size and width of large agricultural vehicles to oncoming traffic from both directions. As a result, agricultural vehicles incorporating the tire marking system 10 do not pose a safety threat to oncoming traffic that would otherwise be unsure of the width of the agricultural vehicle.

The present disclosure also provides for a method of modifying vehicle tires. The method may include boring a hole into the outer edge portion 20 of at least one tire lug 16 of the tire 12, and securing the reflective tire marking 14 within the hole. The hole may be between, and including, 10 mm to 50 mm in depth, for example, 30 mm to 40 mm. The radius of the hole may be between, and including, 10 mm and 50 mm, for example, between 20 mm and 30 mm.

As an alternative to modifying existing vehicle tires, the present disclosure also provides a method of manufacturing a vehicle tire 12 comprising a reflective tire marking 14. For example, the manufacturing process may include forming tire lugs 16 containing the reflective tire marking 14. For example, the tire 12 may be manufactured such that the reflective tire marking 14 may be inserted into the tire 12 during the pressurized molding stage of the tire manufacturing process.

It should be noted that various changes and modifications to the embodiments described herein will be apparent to those skilled in the art. Such changes and modifications may be made without departing from the spirit and scope of the present invention and without diminishing its attendant advantages. For example, various embodiments of the method and portable electronic device may be provided based on various combinations of the features and functions from the subject matter provided herein.

I claim:

1. A method for modifying vehicle tires comprising the steps of:

boring a first hole into an outer edge portion of at least one tire lug of a first tire on a first side of a vehicle, the size of the first hole being between, and including, 10 mm to 50 mm in depth and between, and including, 10 mm to 50 mm in radius;

securing, in the first hole via pressure fit, a first reflective tire marking, the first reflective tire marking being a shape and size such that the first reflective tire marking securely fits into the first hole via a pressure fit;

boring a second hole into an outer edge portion of at least one tire lug of a second tire on a second side of a vehicle opposite width wise to the first side of the vehicle, the size of the second hole being between, and including, 10 mm to 50 mm in depth and between, and including, 10 mm to 50 mm in radius;

securing, in the second hole via pressure fit, a second reflective tire marking, the second reflective tire marking being a shape and size such that the second reflective tire marking securely fits into the second hole via a pressure fit; and wherein, when the first and second reflective tire markings are securely fit in their respective holes, the reflective tire markings provide a visual representation of the width of the vehicle that is visible in low light.

2. The method of claim 1 further comprising the steps of:

boring additional holes into an outer edge portion of additional tire lugs of the first and second tires, the size of the additional holes being between, and including, 10 mm to 50 mm in depth and between, and including, 10 mm to 50 mm in radius;

securing, in the additional holes via pressure fit, additional reflective tire markings, the additional reflective tire markings being a shape and size such that the additional reflective tire markings securely fit into the additional holes via a pressure fit.

3. The method of claim 2 wherein a majority of tire lugs in each of the first and second tires include one of the additional reflective tire markings.

4. The method of claim 1 wherein the depth of each of the holes is between, and including, 30 mm to 40 mm.

5. The method of claim 1 wherein the radius of each of the holes is between, and including, 20 mm to 30 mm.

6. The method of claim 1 wherein the depth of each of the holes is 40 mm and the radius is 15 mm.

7. The method of claim 1 wherein the reflective tire markings are made of a reflective rubber.

8. The method of claim 7 wherein the reflective tire markings are circular cylinders.

* * * * *